(12) United States Patent
Benoit, Jr.

(10) Patent No.: US 9,616,706 B2
(45) Date of Patent: Apr. 11, 2017

(54) ADAPTER FOR DUAL-WHEEL VEHICLE (71) Applicant: Wayne J. Benoit, Jr., Boutte, LA (US)

(72) Inventor: Wayne J. Benoit, Jr., Boutte, LA (US)

( * ) Notice: Subject to any disclaimer, the term of this patent is extended or adjusted under 35 U.S.C. 154(b) by 418 days.

(21) Appl. No.: 14/073,980

(22) Filed: Nov. 7, 2013

(65) Prior Publication Data
US 2015/0123453 A1 May 7, 2015

(51) Int. Cl.
*B60B 11/02* (2006.01)

(52) U.S. Cl.
CPC ........... *B60B 11/02* (2013.01); *B60Y 2200/14* (2013.01)

(58) Field of Classification Search
CPC .......... B60B 11/00; B60B 11/02; B60B 23/12
USPC ........... 301/35.628, 35.629, 36.1, 36.2, 36.3, 301/40.2, 128
See application file for complete search history.

(56) References Cited

U.S. PATENT DOCUMENTS

| | | | |
|---|---|---|---|
| 915,071 A | 3/1909 | Carr | |
| 1,802,773 A * | 4/1931 | Nelson | B60B 11/06 301/11.1 |
| 2,175,294 A * | 10/1939 | Jaeger | B60B 23/12 301/11.1 |
| 2,467,482 A * | 4/1949 | Hutchings | B60B 23/12 301/13.1 |
| 2,657,947 A | 7/1951 | Kerner | |
| 2,935,278 A * | 5/1960 | Lesley | B64C 25/08 244/103 R |
| 3,068,049 A * | 12/1962 | Smith | B60B 11/02 301/36.1 |
| 3,312,236 A * | 4/1967 | Stewart | F16L 3/00 239/741 |
| 3,560,031 A * | 2/1971 | Gilmour, Jr. | B60B 11/02 301/1 |
| 3,747,950 A * | 7/1973 | Hager | B60B 11/00 267/183 |
| 3,837,708 A | 9/1974 | Donnell | |
| 3,847,441 A * | 11/1974 | Morkoski | B60B 11/02 301/36.1 |
| 3,860,297 A | 1/1975 | Solis | |
| 4,007,968 A * | 2/1977 | Solis | B60B 15/26 301/38.1 |
| 4,526,425 A | 7/1985 | Schroeder | |
| 4,818,031 A * | 4/1989 | Brown | B60B 11/02 301/111.04 |
| 6,848,526 B2 | 2/2005 | Burt et al. | |

(Continued)

FOREIGN PATENT DOCUMENTS

| | | | | |
|---|---|---|---|---|
| DE | | 522847 C * | 4/1931 | ............. B60B 23/12 |
| DE | EP 0392178 A1 * | | 10/1990 | ............. B60B 11/02 |

(Continued)

*Primary Examiner* — Kip T Kotter
(74) *Attorney, Agent, or Firm* — Timothy J. Monahan; Monahan & Company, LLC (57) ABSTRACT

A kit for a dual wheel assembly for a vehicle is provided having a drive shaft adapter with an outwardly projecting extension attachable to an inner wheel by a flange and a drive shaft coupler having an outwardly projecting receiver attachable to an outer wheel with a flange, whereby drive shaft extension and receiver are telescopically engageable over a range of distances, which allows the inner wheel and outer wheel to be mounted with the tires abutting or the tires spaced apart by incorporating a spacer element into the assembly.

18 Claims, 9 Drawing Sheets (56) References Cited

U.S. PATENT DOCUMENTS

2004/0040761 A1 * 3/2004 Burt .................... B60B 11/00
                                                                        180/69.4
2005/0225105 A1   10/2005 Meyer

FOREIGN PATENT DOCUMENTS

| DE | 19607757 A1 | * | 9/1996 | ............ B60B 11/02 |
| --- | --- | --- | --- | --- |
| GB | 1255659 A | * | 12/1971 | ............ B60B 11/02 |
| JP | 59160604 A | * | 9/1984 | |

* cited by examiner

ADAPTER FOR DUAL-WHEEL VEHICLE

This invention is related to an adapter for mounting a second, outer wheel to the first, inner wheel of a vehicle.

BACKGROUND OF THE INVENTION

Various adapters have been developed to add a second, outer wheel to the existing wheel of a vehicle. For example, an outer wheels may be added to each of a pair of inner wheels, positioned on opposite sides of a vehicle, to improve traction, buoyancy, stability and load bearing capability.

Smith—U.S. Pat. No. 3,068,049 discloses a transfer ring that is sandwiched between the rims of an inner and outer wheel, to create a dual-wheel vehicle. Notches in the transfer ring engage lugs welded to the surface of the rims to transfer torque from the inner wheel to the outer wheel. The transfer ring maintains the outer and inner wheels in spaced apart alignment.

Solis—U.S. Pat. Nos. 3,860,297 and 4,007,968 discloses a two part wheel accessory. A first part is mounted on the hub of the inner wheel and projects outward, and the second part is mounted on the hub of the outer wheel and projects inward. The first and second adapter parts have corresponding slots and extensions that are mateable for transferring torque from the inner wheel to the outer wheel.

Schroeder—U.S. Pat. No. 4,526,425 discloses a dual wheel mounting arrangement whereby blade-shaped spokes extending from the outer wheel mate with recesses in a hub affixed to the inner wheel. A bolt extending through the center of the second wheel engages a threaded adapter bracket in the center of the inner wheel hub, to join the two wheels together.

Brown—U.S. Pat. No. 4,818,031 discloses an outer wheel having an inwardly extending spacer sleeve with drive pins extending therefrom. The drive pins engage holes in an anchor plate attached to the outwardly facing side of the inner wheel. A bolt extending through the spacer sleeve engages a threaded opening in the anchor plate to secure the outer wheel to the inner wheel.

Meyer—US Patent Application No. 2005/0225105 discloses a convertible road and rail wheel assembly. The inner and outer wheels each have projecting shafts that are joined together by a central coupler. Torque is transferred by bolts passing through holes in the shafts and central coupler, with the holes being aligned transverse to the axis of rotation of the wheels.

Burt et al.—U.S. Pat. No. 6,848,526 disclose a vehicle with a dual wheel assembly. An inner hub connected to the inner wheel and an outer hub connected to the outer wheel are held together by a bolt extending through the center of the outer wheel and outer hub. The bolt is threaded into an opening in the inner hub. The outer hub has a pair of pins that engage slots in the inner hub to transfer torque from the inner wheel to the outer wheel.

Despite the development of prior art adapters for creating a dual-wheeled vehicle, shortcomings remain. The drive connection on many of the adapters comprises pins, clips or spokes extending from one hub that must be mated with corresponding holes, slots or recesses in the opposite hub. Often the drive connections require custom machined parts with narrow tolerances, which increases the cost of the adapters. Some of the adapters require modification of the rims of one or more of the wheels, for example, welding lugs to the rims so that a drive connection can engage the rims. Most, if not all, of the prior art adapters are customized for a particular set of vehicle wheels, wheel width and wheel spacing, and therefore lack universal application. Another drawback of the prior art adapters is that they are difficult to assemble, for example, requiring that the outer wheel be held in place while a bolt is threaded into a receiver.

These and other shortcomings in the prior art are addressed by the adapter of the present invention.

SUMMARY OF THE INVENTION

The present invention is directed to a dual wheel assembly for vehicles and a vehicle having the dual wheel assembly installed thereon. The term "dual wheel assembly" refers to two wheels—an inner wheel and an outer wheel—mounted on the same vehicle hub. A typical passenger automobile or truck will have four hubs. All-terrain vehicles (ATVs) may have from three to six hubs. The wheel assembly may be installed on one or more hubs of a vehicle. Preferably, a pair of dual wheel assemblies will be installed on a set of hubs located directly opposite from each other on a vehicle, for balanced and uniform performance. Also within the scope of the present invention is to provide a kit for adapting a single wheel to a dual wheel assembly.

A vehicle hub will typically have four, five, six, eight or ten threaded wheel studs arranged in a bolt circle. Corresponding holes are arranged in the wheel, so that the wheel may be fitted over the studs and secured in place by lugs screwed onto the studs. The wheel will typically also have a center bore, which fits over the mounting hub, thereby centering and stabilizing the wheel in relation to the hub.

The dual wheel assembly includes a drive shaft adapter, mounted on the exterior side of the inner wheel, and drive shaft receiver, mounted on the interior side of the outer wheel and a rod fastened at one end to the drive shaft adapter and at the other end to the outer wheel.

The drive shaft adapter has a flange for mounting the adapter to the hub and a drive shaft extension, aligned perpendicular to the flange. The flange has a plurality of spaced apart holes, arranged to correspond to the bolt circle layout of the wheel studs. The flange is installed over the inner wheel by removing the lugs, placing the flange over the exterior facing side of the wheel with the drive shaft extension pointing outward from the vehicle, and reinstalling the lugs to sandwich the wheel between the hub and the drive shaft adapter flange.

A drive shaft coupler has a flange for mounting the coupler to the outside wheel and a drive shaft receiver, aligned perpendicular to the flange. The flange has a plurality of spaced apart holes, arranged to correspond to the bolt circle layout of the holes in the outer wheel. The flange is fastened to the interior facing side of the outer wheel, for example, by bolting the two together with bolts extending though the corresponding holes, with the drive shaft receiver pointing inward toward the vehicle. The drive shaft receiver has an interior opening extending along its length. Once the drive shaft adapter and the drive shaft coupler are fastened to the inner wheel and outer wheel, respectively, the outer wheel of the dual wheel assembly can be installed, by sliding the drive shaft receiver (female) over the drive shaft extension (male), in a telescoping arrangement.

The cross-sectional shape of each of the drive shaft extension and drive shaft receiver is adapted for the power transfer function within the invention. In particular, power is transferred by the outer surface of the drive shaft extension engaging the inner surface of the drive shaft receiver. This may be accomplished by providing a drive shaft extension and receiver with, mateable, non-circular cross-sections. By way of example, the cross-sections of the drive shaft extension and receiver may be complimentary geometric shapes, such as triangular, rectangular (preferably square), pentagonal or hexagonal. In one embodiment of the invention, power is transferred between the drive shaft extension and receiver along the length over which the extension and receiver overlap.

The present invention provides several advantages over prior art adapters. The drive shaft extension and receiver may be made of common metal stock, such as square bars and square tubes, respectively, and welded to a round metal plate (flange), rather than machining the part from a single block. In one embodiment of the invention, the outer dimensions of the drive shaft extension and the inner dimensions of the drive shaft receiver are uniform over the length of the overlapping section, when the parts telescopically engaged. No additional pins, clips, keys, etc. are required to lock the drive shaft extension and receiver together—once they are telescopically engaged, power can be transferred. When the drive shaft extension and receiver are telescopically engaged, the drive shaft extension supports the outer wheel, while it is being fastened, which is facilitated by allowing the drive shaft receiver to overlap the drive shaft extension. Furthermore, the length of the overlap between the drive shaft extension and receiver spreads the power transfer over a wider area and reduces stress on the components. By way of example, the overlap may be ½ inch or more, in particular 4 inches or more, or even 8 inches or more.

The outer wheel is held in place by a rod fastened at one end to the drive shaft adapter and at the other end to the outer wheel, with the rod extending through the drive shaft receiver and the center bore of the outer wheel. In one embodiment of the invention, the rod is a bolt threaded at one end into an internal thread in the drive shaft extension (or nut welded to the end of a hollow drive shaft extension), with the shaft of the bolt passing through the drive shaft receiver and center bore of the outer wheel, and with a head or head and washer combination secured against the exterior facing side of the outer wheel. Instead of a unitary bolt with a head, the end of the rod extending through the center bore of the outer wheel may have a threaded end, and the outer wheel may be held in place by nut secured in place over the threaded end. In another embodiment of the invention, the rod extends from the drive shaft extension, through the drive shaft receiver and center bore of the outer wheel, and the end of the rod protrudes past the outer wheel and has a transverse hole bored through it, into which a pin, such as a linchpin, can be inserted crosswise, to lock the outer wheel in place.

Another advantage of the present dual wheel assembly is its flexibility of accommodate a variety of combinations of wheels and tires. In one embodiment of the invention a bolt holding the outer wheel in place may be tightened until the tire of the inner wheel and the tire of the outer wheel are forced into contact with each other. The arrangement is particularly advantageous for use with ATVs to block mud from accumulating between the wheels. In another embodiment of the invention, the length of the drive shaft receiver may be selected so that the inwardly projecting end of the receiver will abut the flange of the drive shaft adapter when the outer wheel is secured in place, with the tires of the inner wheel and outer wheel spaced a fixed distance apart. The distance between the inner wheel and the outer wheel can be adjusted as desired, by inserting a spacer sleeve over the drive shaft extension and against the drive shaft adapter flange. For example, the cross-section of the spacer sleeve may be the same dimension as the cross-section of the drive shaft receiver, so that the end of the drive shaft receiver will securely abut the end of the spacer sleeve. In yet another embodiment of the invention, an annular spacer ring may be provided between the rim of the inner wheel and the rim of the outer wheel, so that tightening the bolt will clamp the spacer ring in place between the rims, without the drive shaft coupler abutting the drive shaft adapter. Accordingly, it can be understood that the distance between the inner and outer wheels can be readily adjusted, to accommodate various sizes of wheels and tires.

DETAILED DESCRIPTION OF THE INVENTION

Without intending to limit the scope of the invention, the preferred embodiments and features are hereinafter set forth. All United States patents cited in the specification are incorporated herein by reference.

Figure 1:
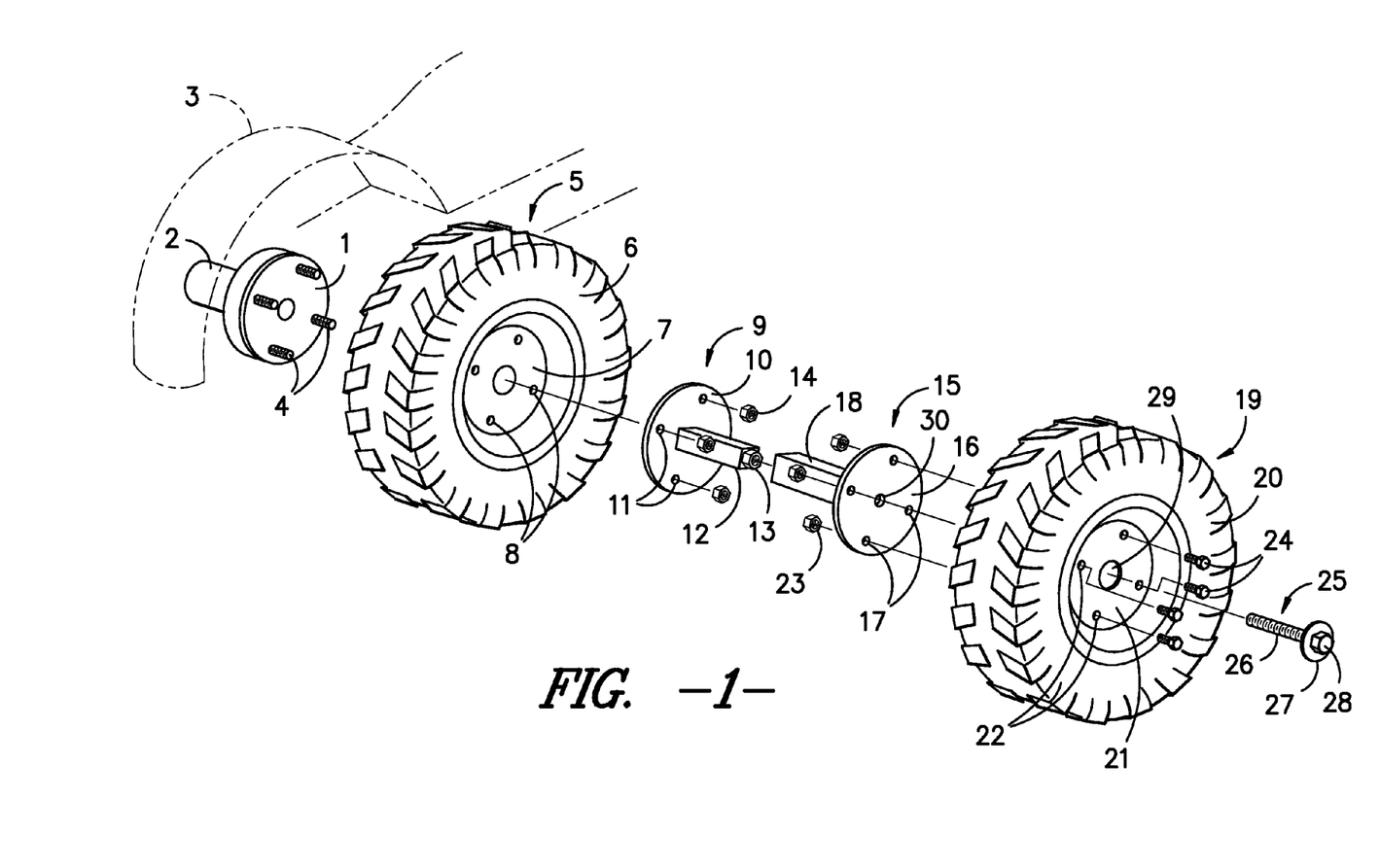
FIG. 1 an exploded, perspective view of the adapter for a dual-wheel vehicle.

Referring to FIG. 1, an exploded view of the subject adapter is shown in combination with an inner and outer wheel. Hub 1 is supported on axle 2, which is part of vehicle 3. Hub 1 has wheel studs 4 arranged in a circle, extending therefrom. Inner wheel 5 has tire 6 mounted on rim 7. Holes 8 in rim 7 are arranged in a bolt circle corresponding to wheel studs 4.

Drive shaft adapter 9 has flange 10 with holes 11 arranged in a bolt circle corresponding to wheel studs 4. Drive shaft extension 12 is affixed to flange 10, for example by welding, and extends perpendicularly therefrom. Drive shaft extension 12 has a threaded portion on the end opposite flange 10. The threaded portion may be nut 13, as shown, welded to a hollow drive shaft extension. Alternatively, drive shaft extension 12 may be a solid piece that has been tapped to provide threads along its length to receive a threaded rod.

Figure 2:
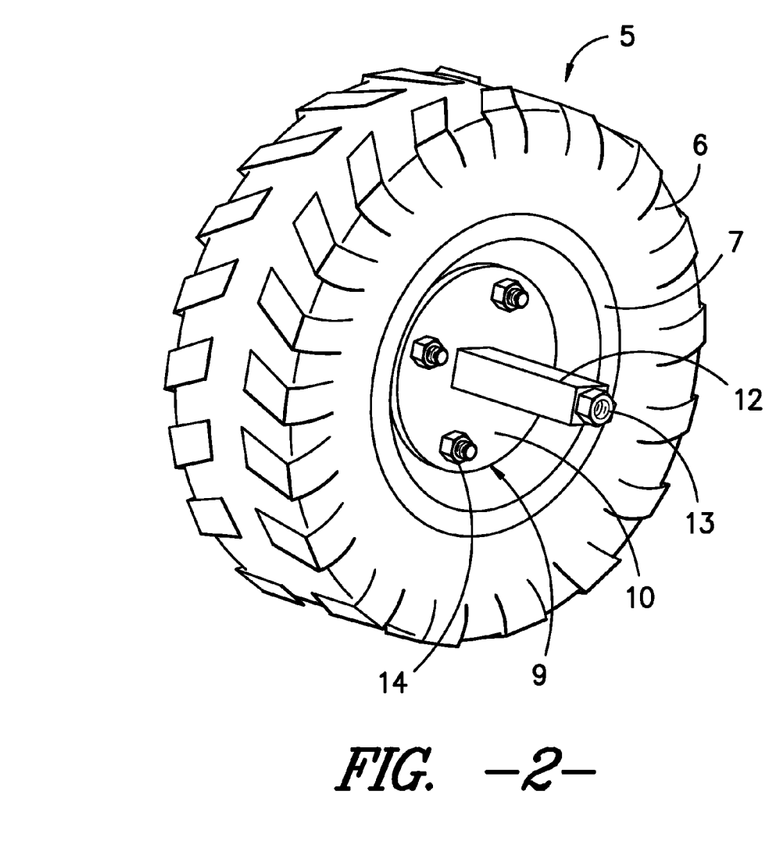
FIG. 2 is a side perspective view of the drive shaft adapter attached to the inner wheel.

First, inner wheel 5 is placed on hub 1, with wheel studs 4 extending through holes 8 in rim 7. Next, drive shaft adapter 9 is placed over rim 7 of inner wheel 5, with wheels studs 4 extending through holes 11 in flange 10. Last, lug nuts 14 are threaded on wheels studs 4, over flange 10, as shown in FIG. 2.

Figure 3:
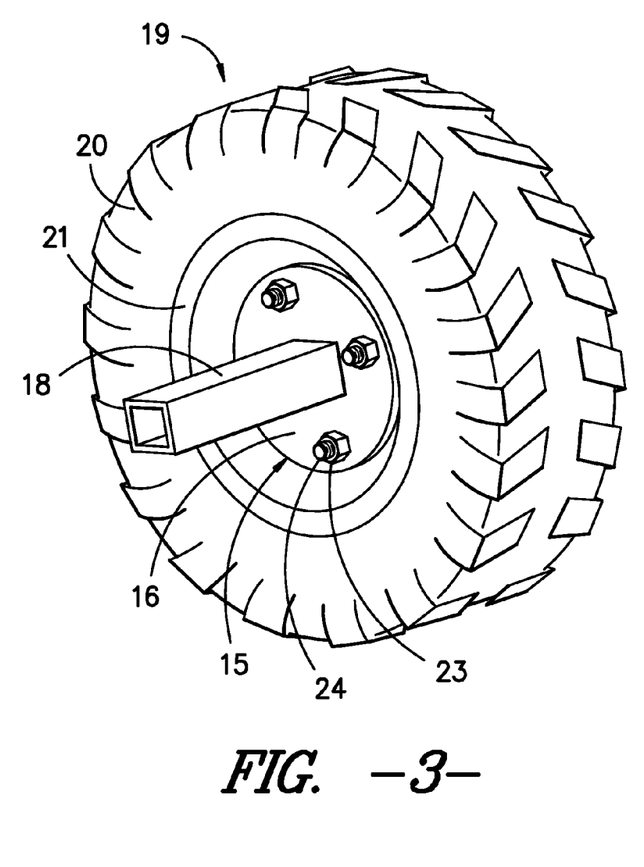
FIG. 3 is a side perspective view of the drive shaft coupler attached to the outer wheel.

Referring to FIGS. 1 and 3, drive shaft coupler 15 has flange 16 with holes 17 arranged in a bolt circle. Drive shaft receiver 18 is affixed to flange 16, for example by welding, and extends perpendicularly from flange 16. Drive shaft receiver 18 is hollow and is designed to telescopically engage drive shaft extension 12. Outer wheel 19 has tire 20 and rim 21 with holes 22 arranged in a bolt circle. Holes 17 in flange 16 and holes 22 in rim 21 align, allowing flange 16 to be attached to rim 21, for example, by nuts 23 and bolts 24. Rod 25 has a threaded end 26, which can be screwed into nut 13 of drive shaft extension 12, and washer 27 and head 28. The threads of nut 13 and rod 25 may be configured as left-handed or right-handed, so that resistance to forward revolution of outer wheel 19 will tend to tighten, rather than loosen the connection. Alternatively, rod 25 may be provided with a second threaded end, instead of head 28, and a nut (not shown) may be fastened to the threaded end to secure the outer wheel.

Figure 4:
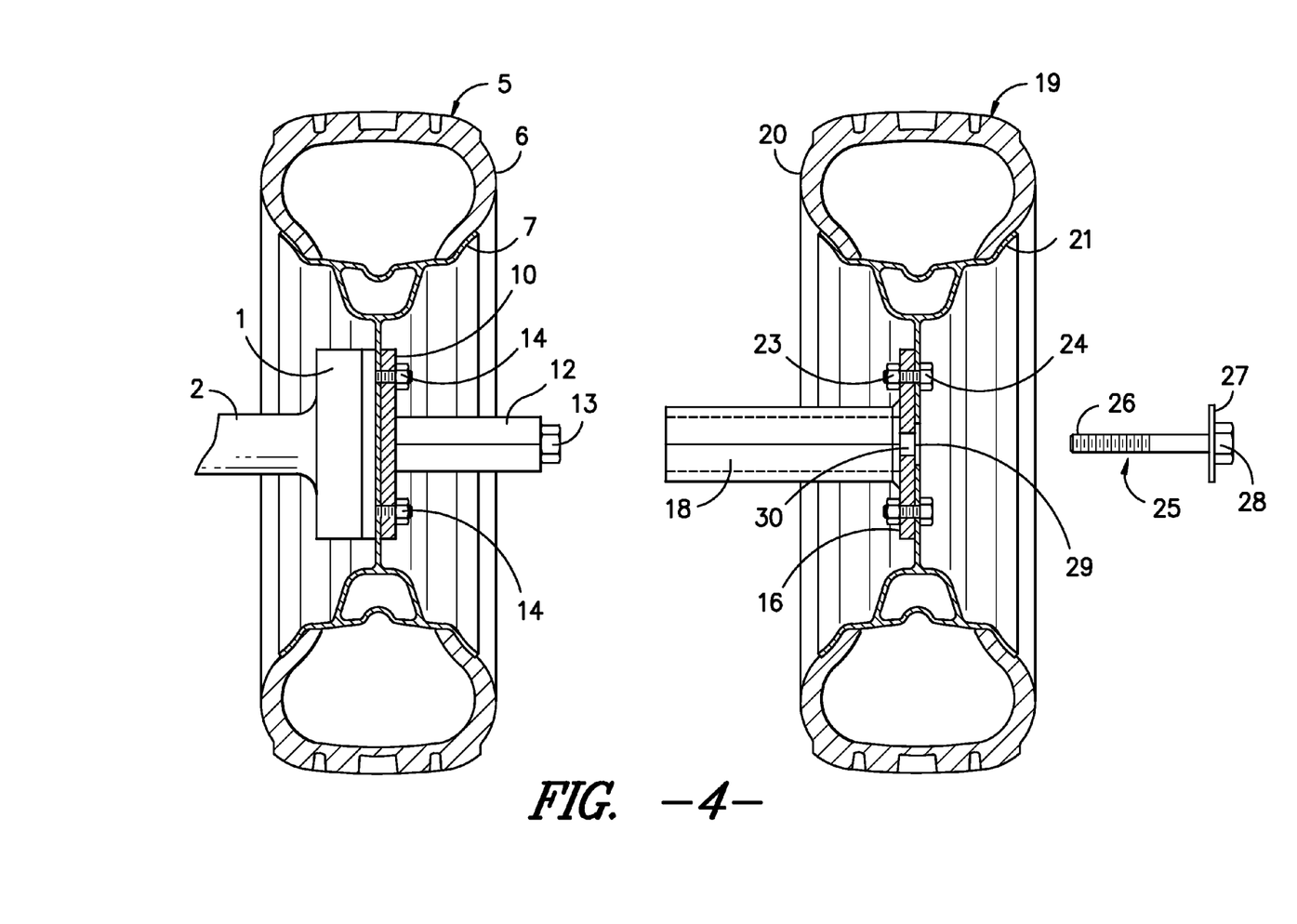
FIG. 4 is a sectional, side view of the inner wheel and outer wheel positioned for assembly.
Figure 5:
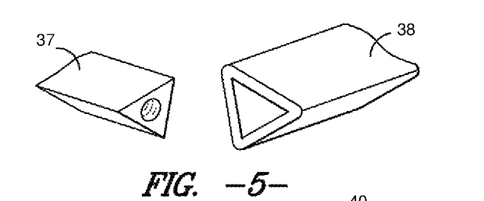
FIG. 5 is a side perspective view of the mateable drive shaft extension and drive shaft receiver having a triangular cross-section.
Figure 6:
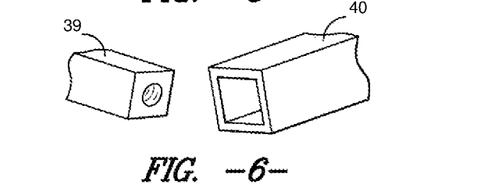
FIG. 6 is a side perspective view of the mateable drive shaft extension and drive shaft receiver having a rectangular cross-section.
Figure 7:
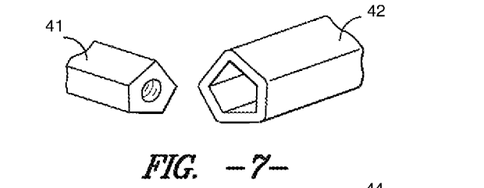
FIG. 7 is a side perspective view of the mateable drive shaft extension and drive shaft receiver having a pentagonal cross-section.
Figure 8:
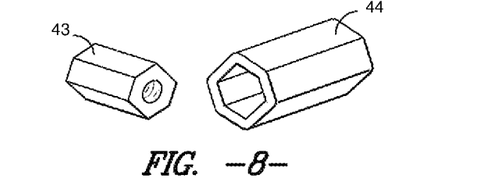
FIG. 8 is a side perspective view of the mateable drive shaft extension and drive shaft receiver having a hexagonal cross-section.

Rod 25 is inserted through center bore 29 in rim 21 of outer wheel 19 and through opening 30 in flange 16, as shown in more detail in the exploded cut-away view in FIG. 4. Drive shaft receiver 18 and drive shaft extension 12 are telescopically mateable, as the female and male component, respectively. Mateable components having polygonal cross-sections whereby the polygon has internal angles ranging from 60° to 135° may be employed. Drive shaft receivers and drive shaft extensions having corresponding geometrical cross-sections suitable for use in the present invention are exemplified in FIGS. 5-8. By way of example, the cross-section of the telescoping components drive shaft extension 37 and drive shaft receiver 38 may be triangular (FIG. 5), or components drive shaft extension 39 and drive shaft extension 40 may be rectangular, in particular square (FIG. 6), or components drive shaft extension 41 and drive shaft receiver 42 may be pentagonal (FIG. 7) or components drive shaft extension 43 and drive shaft receiver 44 may be hexagonal (FIG. 8). In one embodiment of the invention, both the drive shaft extension and the drive shaft receiver have a uniform cross-section along their lengths.

The versatility of the present invention allows the inner wheel and outer wheel to be installed with (i) the tires of the respective wheels abutting; (ii) the inner wheel and the outer wheel spaced apart and the drive shaft adapter and the drive shaft coupler abutting; (iii) a spacer ring inserted between the rims of the inner and outer wheel, so that the rims abut the spacer ring; or (iv) a spacer sleeve over the drive shaft extension, with the drive shaft receiver abutting the spacer sleeve. The flexibility arises from the simplicity of the power transfer mechanism, whereby torque is transferred from the outer surface of the drive shaft extension 12 to the inner surface of the drive shaft receiver 18. Torque may be effectively transferred even though the overlap between drive shaft extension 12 and drive shaft receiver 18 may be varied by a distance of 1 inch or more, 2 inches or more or even four inches or more, depending upon the configuration selected from the options disclosed herein.

Figure 9:
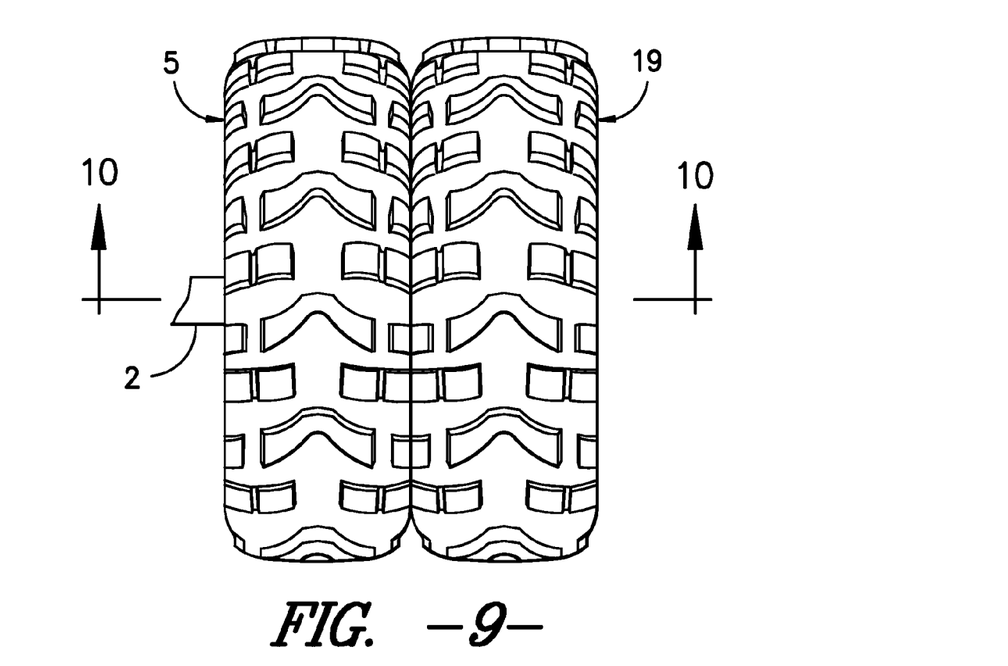
FIG. 9 is a side view of the dual-wheel assembly, with the tires of the wheels in contact.
Figure 10:
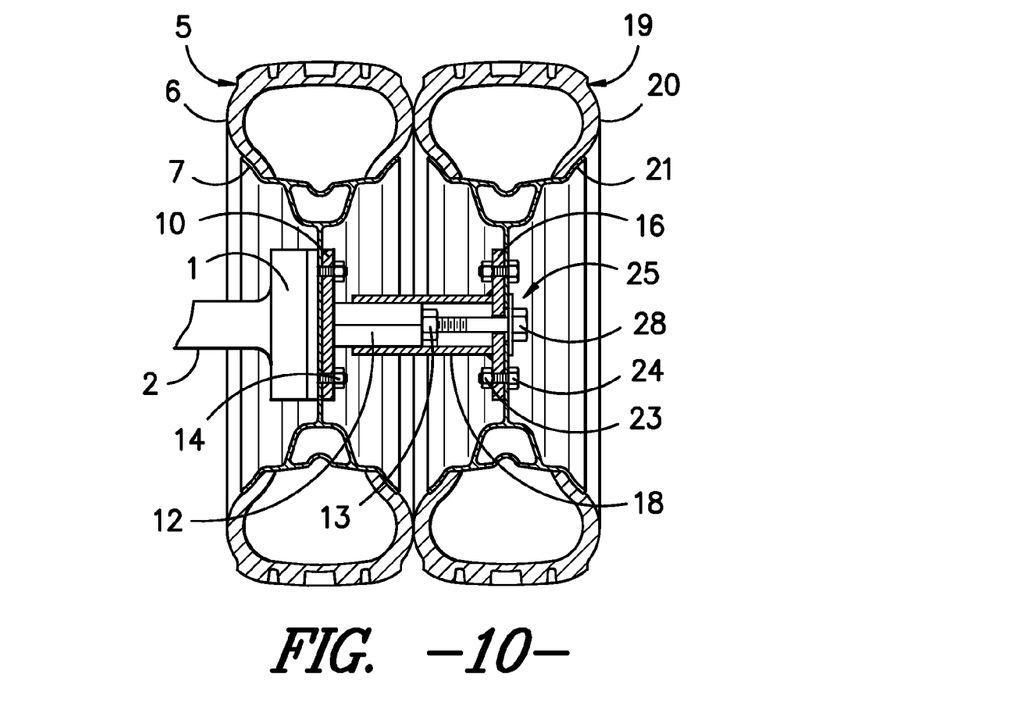
FIG. 10 is a side sectional view of FIG. 9.

Referring to FIGS. 9 and 10, an embodiment of the invention is shown in which tire 6 of inner wheel 5 and tire 20 of outer wheel 19 are abutting. It can be understood that rod 25 (bolt) is tightened until the tires are firmly pressed against each other, without causing drive shaft receiver 18 to abut flange 10 of drive shaft adapter 9. This configuration stabilizes and supports outer wheel 19 and blocks mud from entering the space between inner wheel 5 and outer wheel 19.

Figure 11:
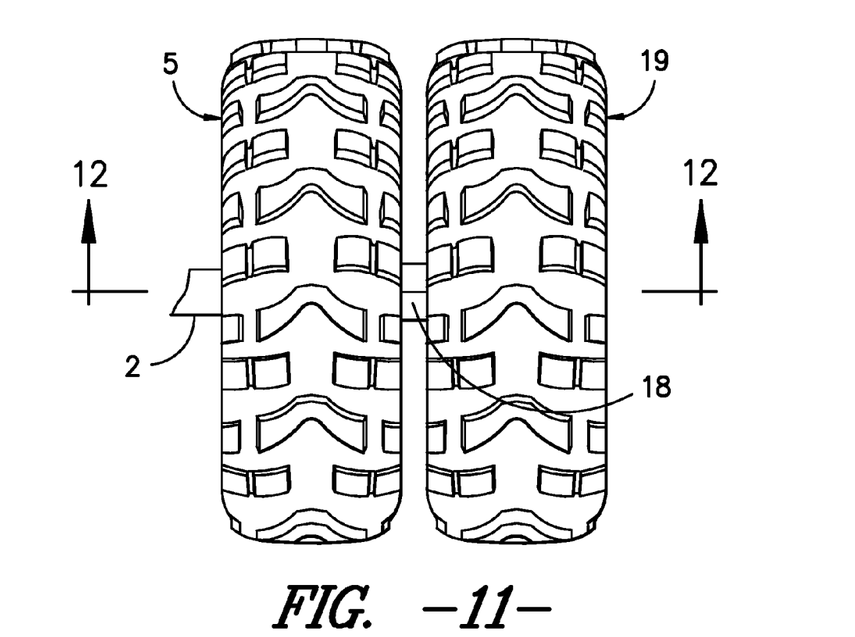
FIG. 11 is a side view of the dual-wheel assembly, with the tires of the wheels spaced apart a fixed distance.
Figure 12:
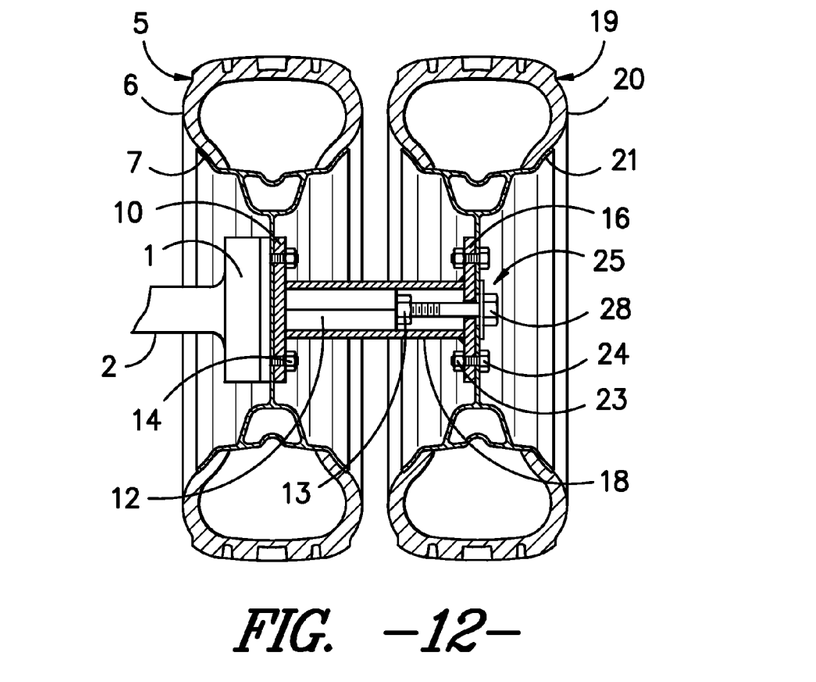
FIG. 12 is a side sectional view of FIG. 11.

Referring to FIGS. 11 and 12, an embodiment of the invention is shown in which tire 6 of inner wheel 5 and tire 20 of outer wheel 19 are fixed in spaced apart relation. It can be understood that rod 25 (bolt) is tightened until the drive shaft receiver 18 firmly abuts flange 10 of drive shaft adapter 9.

Figure 13:
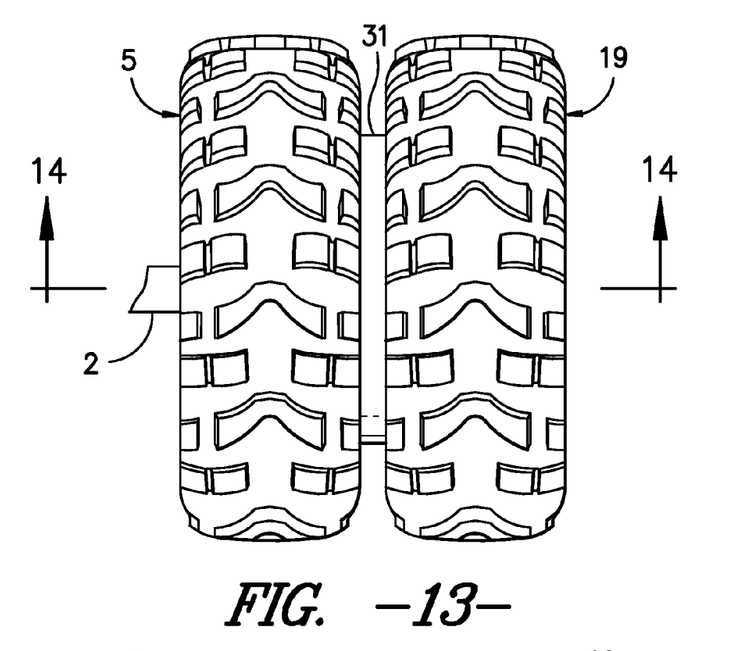
FIG. 13 is a side view of the dual-wheel assembly, with a spacer ring positioned between the rims of the inner and outer wheels to maintain the a fixed distance apart.
Figure 14:
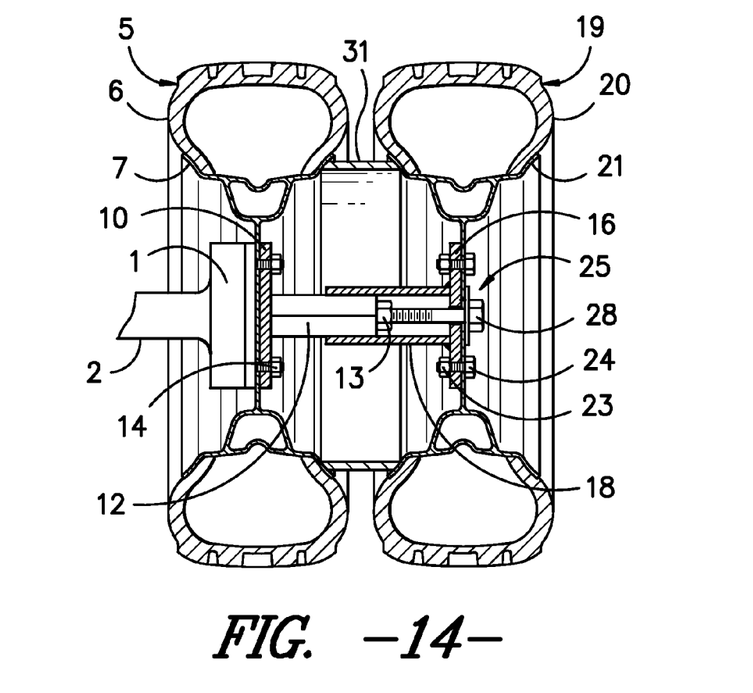
FIG. 14 is a side sectional view of FIG. 13.

Referring to FIGS. 13 and 14, an embodiment of the invention is shown with spacer ring 31 positioned between rim 7 of inner wheel 5 and rim 21 of outer wheel 19. No modification of rims 7 and 21 is required, since torque is primarily transferred via the drive shaft extension and receiver. Spacer ring 31 functions to stabilize the outer wheel, prevent mud, vines and other debris from entering the space between the wheels, and maintains the inner and outer wheel a fixed distance apart It can be seen in FIG. 14, that spacer rings having different widths and diameters may be provided to accommodate a variety of wheel pairs, and that the drive shaft extension and drive shaft receiver may telescope to accommodate the different widths, whereby the bolt holding the outer wheel in place may be tightened until spacer ring 31 firmly abuts rim 7 and rim 21 on either side. In the embodiment illustrated, drive shaft receiver 18 does not abut drive shaft adapter 9.

Figure 15:
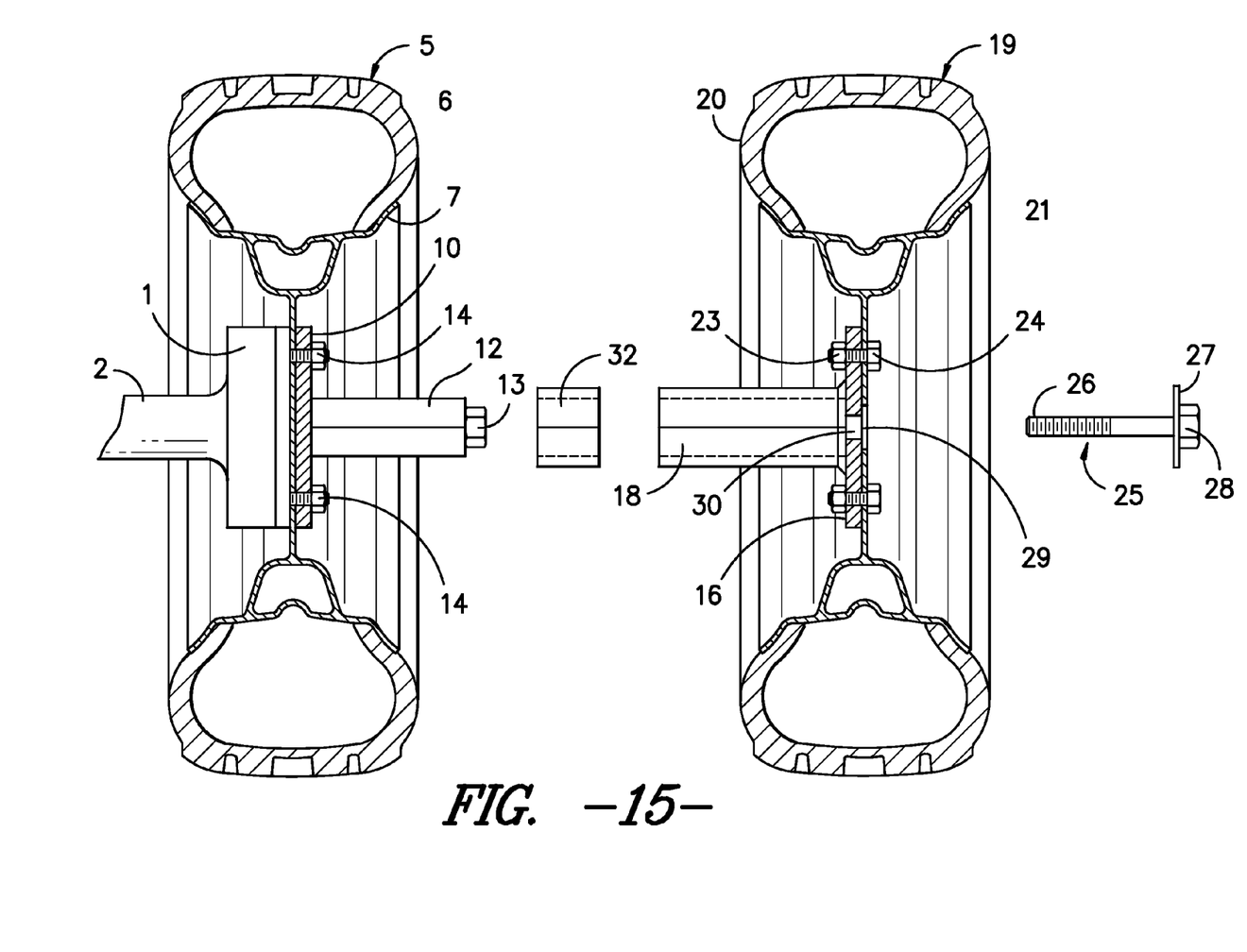
FIG. 15 is a sectional, side view of the inner wheel and outer wheel positioned for assembly, with a spacer sleeve.

Thus, drive shaft receiver 18 can be provided in different lengths, depending upon whether the operator desires to mount inner wheel 5 and outer wheel 19 with their respective tires pressed against each other or spaced apart. Alternatively, as shown in FIG. 15, the dual wheel assembly may be provided with a spacer sleeve 32. The cross-section of spacer sleeve 32 may correspond to the cross-section of drive shaft receiver 18, so that spacer sleeve 32 may fit over drive shaft extension 12 and squarely abut the end of drive shaft receiver 18. Accordingly, the drive shaft receiver 18 may be provided in a single length and the inner wheel and outer wheel may be mounted with their tires abutting or with the tires spaced apart, with the end of drive shaft receiver 18 abutting spacer sleeve 31 and spacer sleeve 31 abutting drive shaft adapter 9, in particular flange 10.

Figure 16:
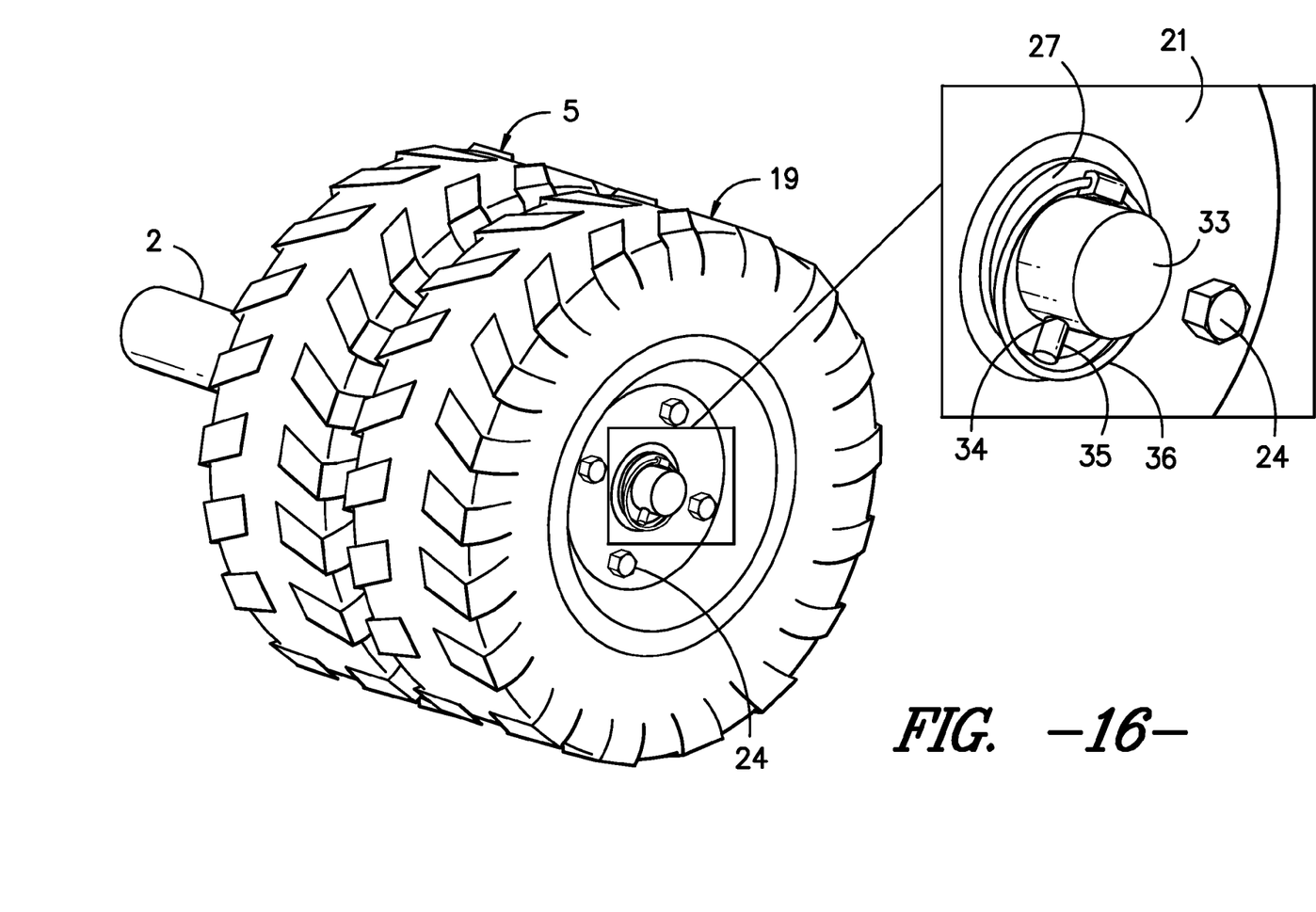
FIG. 16 is a side perspective view of the dual-wheel assembly with a linchpin through the rod, securing the outer wheel.

While rod 25 has been shown as a bolt with washer 27 and head 28 holding outer wheel 19 in place, head 28 may alternatively be replaced with a shaft 33 having transverse bore 34 and linchpin 35 inserted crossways, as shown in FIG. 16. Linchpin 35 is retained by ring 36.

The present invention may be provided as a kit for converting a single wheel assembly to a dual wheel assembly. The basic components of the kit will include (i) a drive shaft adapter, which includes a drive shaft extension extending perpendicularly from a flange configured to be bolted to the hub of a vehicle over an inner wheel, (ii) a drive shaft coupler, which includes a drive shaft receiver extending perpendicularly from a flange configured to be bolted to the inside of an outer wheel, and (iii) a rod extending through the drive shaft receiver and engaging the drive shaft extension, for connecting the outer wheel to the drive shaft adapter. The kit may further include one or more spacers to fix the distance between the inner and outer wheels, when the outer wheel is attached to the vehicle. By way of example, the spacer may be the above described spacer sleeve, which can be inserted over the drive shaft extension, between the drive shaft receiver and the drive shaft adapter flange, and the drive shaft receiver abuts the spacer sleeve. It can be understood that the kit may be provided with one, two or more spacer sleeves, having the same or different lengths, which can be combined to adjust the distance between the wheels of the dual wheel assembly. The spacer may be a spacer ring that is positioned between the rims of the inner wheel and the outer wheel to maintain the wheels a fixed distance apart when the outer wheel is fastened to a vehicle, as described above. It can be understood that the spacer ring may be provided in different lengths and diameters, to accommodate various size vehicle wheels and configurations. Also within the scope of the invention is to provide a kit for a dual wheel assembly with both a spacer sleeve and a spacer ring. Alternatively, the spacers may be sold separately, as an add-on for the dual wheel assembly kit.

The invention has been described in relation to a dual wheel assembly on one hub of a vehicle. It can be understood that a mirror image of the dual wheel assembly may be provided on a hub located on the opposite side of a vehicle. Furthermore, the dual wheel assembly may be provided on three, four or more hubs of a vehicle. The invention is particularly useful for ATVs, but may also be used with other vehicles, including cars, trucks, trailers, agricultural equipment, such as tractors and combines, as well as wheeled heavy equipment, such as loaders, graders and forklifts.

There are, of course, many alternative embodiments and modifications, which are intended to be included within the following claims.

What I claim is:

1. A dual wheel assembly for a vehicle having an inner wheel mounted on a hub and an outer wheel, comprising:
    (a) a drive shaft adapter having a flange and a drive shaft extension perpendicular to the flange, whereby the drive shaft adapter flange has a plurality of spaced openings corresponding to wheel studs extending from the hub of the vehicle and the flange is mounted on the studs, over an exterior facing side of the inner wheel, and whereby the drive shaft extension is characterized by an outer surface along its length;
    (b) a drive shaft coupler having a flange and a drive shaft receiver extending perpendicular from the flange, whereby the drive shaft coupler flange has a plurality of spaced apart openings corresponding to respective openings in the outer wheel and a central opening, and the flange is fastened to the outer wheel by fasteners extending through the openings in the flange and the outer wheel, and whereby the drive shaft receiver has an interior opening extending along its length and the interior opening is characterized by an inner surface corresponding to the shape of the outer surface of the drive shaft extension, and the drive shaft receiver is telescopically engaged with the drive shaft extension with the inner wheel and outer wheel in parallel alignment, wherein the drive shaft extension and the drive shaft receiver are mateable, with a geometric cross-section selected from the group consisting of structures having a polygonal cross-section with internal angles in the range of 60° to 135°, such that power is transferred from the outer surface of the drive shaft extension to the inner surface of the drive shaft receiver along a length where the drive shaft extension and drive shaft receiver overlap, and wherein the length of the overlap may be varied;
    (c) a rod having a first end threaded into an internal thread in the drive shaft extension, the rod extending through the drive shaft receiver, the central opening in the drive shaft coupler flange and an opening in the center of the outer wheel, the rod having a second end with a fastener connecting the rod to the outer wheel, whereby tightening the rod varies the length of the overlap of the drive shaft extension and the drive shaft receiver; and
    (d) wherein the inner wheel includes a tire having an exterior facing surface and the outer wheel includes a tire having an interior facing surface, and wherein the exterior facing side of the inner wheel tire is pressed into contact with the interior facing surface of the outer wheel tire, without the drive shaft receiver abutting the flange of the drive shaft adapter.

2. The dual wheel assembly of claim 1, wherein the outer surface of the drive shaft extension and the inner surface of the drive shaft receiver are uniform along the length where the drive shaft extension and drive shaft receiver telescopically overlap, and the drive shaft extension and the drive shaft receiver overlap along a distance of 4 inches or more.

3. The dual wheel assembly of claim 1, wherein the drive shaft extension and the drive shaft receiver are selected from the group consisting of materials having a triangular, rectangular, pentagonal or hexagonal cross-section.

4. The dual wheel assembly of claim 1, wherein the fastener connecting the second end of the rod to the outer wheel is selected from the group consisting of a head positioned at the second end of the rod, a nut threaded onto the second end of the rod, and a snap ring assembly positioned in a hole extending perpendicularly through the second end of the rod.

5. A dual wheel assembly for a vehicle having an inner wheel mounted on a hub and an outer wheel, comprising:
    (a) a drive shaft adapter having a flange and a drive shaft extension perpendicular to the flange, whereby the drive shaft adapter flange has a plurality of spaced openings corresponding to wheel studs extending from the hub of the vehicle and the flange is mounted on the studs, over an exterior facing side of the inner wheel, and whereby the drive shaft extension is characterized by an outer surface along its length;
    (b) a drive shaft coupler having a flange and a drive shaft receiver extending perpendicular from the flange, whereby the drive shaft coupler flange has a plurality of spaced apart openings corresponding to respective openings in the outer wheel and a central opening, and the flange is fastened to the outer wheel by fasteners extending through the openings in the flange and the outer wheel, and whereby the drive shaft receiver has an interior opening extending along its length and the interior opening is characterized by an inner surface corresponding to the shape of the outer surface of the drive shaft extension, and the drive shaft receiver telescopically overlaps with the drive shaft extension with the inner wheel and outer wheel in parallel alignment, such that power is transferred from the outer surface of the drive shaft extension to the inner surface of the drive shaft receiver;
    (c) a rod having a first end fastened to the drive shaft extension, the rod extending through the drive shaft receiver, the central opening in the drive shaft coupler flange and an opening in the center of the outer wheel, the rod having a second end with a fastener connecting the rod to the outer wheel; and
    (d) a spacer sleeve positioned on the outer surface of drive shaft extension, wherein the overlap of the drive shaft extension and the drive shaft receiver is limited by the spacer sleeve.

6. The dual wheel assembly of claim 5, wherein the drive shaft receiver has an end opposite the drive shaft coupler flange and the end of the receiver abuts a first end of the spacer sleeve and a second end of the spacer sleeve abuts the drive shaft adapter flange.

7. The dual wheel assembly of claim 5, wherein the overlap of the drive shaft extension and the drive shaft receiver is limited by a distance of 1 inch or more by the spacer sleeve.

8. The dual wheel assembly of claim 5, wherein the overlap of the drive shaft extension and the drive shaft receiver is limited by a distance of 2 inches or more by the spacer sleeve.

9. The dual wheel assembly of claim 5, wherein the drive shaft extension and the drive shaft receiver are mateable, with a geometric cross-section selected from the group consisting of structures having a polygonal cross-section with internal angles in the range of 60° to 135°.

10. The dual wheel assembly of claim 5, wherein the drive shaft extension and the drive shaft receiver are selected from the group consisting of materials having a triangular, rectangular, pentagonal or hexagonal cross-section.

11. The dual wheel assembly of claim 5, wherein the first end of the rod is threaded into the drive shaft extension and the second end of the end of the rod is a head secured against an exterior facing side of the outer wheel.

12. A dual wheel assembly for a vehicle having an inner wheel mounted on a hub and an outer wheel, comprising:
(a) a drive shaft adapter having a flange and a drive shaft extension perpendicular to the flange, whereby the drive shaft adapter flange has a plurality of spaced openings corresponding to wheel studs extending from the hub of the vehicle and the flange is mounted on the studs, over an exterior facing side of the inner wheel, and whereby the drive shaft extension is characterized by an outer surface along its length and a non-circular cross-section;
(b) a drive shaft coupler having a flange and a drive shaft receiver extending perpendicular from the flange, whereby the drive shaft coupler flange has a plurality of spaced apart openings corresponding to respective openings in the outer wheel and a central opening, and the flange is fastened to the outer wheel by fasteners extending through the openings in the flange and the outer wheel, and whereby the drive shaft receiver has an interior opening extending along its length and the interior opening is characterized by an inner surface corresponding to the shape of the outer surface of the drive shaft extension, and the drive shaft receiver is telescopically engaged with the drive shaft extension with the inner wheel and outer wheel in parallel alignment, such that power is transferred from the outer surface of the drive shaft extension to the inner surface of the drive shaft receiver along a length where the drive shaft extension and drive shaft receiver overlap, and wherein the length of the overlap may be varied;
(c) a bolt having a first end threaded into an internal thread in the drive shaft extension, the bolt extending through the drive shaft receiver, the central opening in the drive shaft coupler flange and an opening in the center of the outer wheel, the bolt having a second end with a head secured against an exterior facing side of the outer wheel, whereby tightening the bolt varies the length of the overlap of the drive shaft extension and the drive shaft receiver; and
(d) wherein the inner wheel includes a tire having an exterior facing surface and the outer wheel includes a tire having an interior facing surface, and wherein the exterior facing side of the inner wheel tire is pressed into contact with the interior facing surface of the outer wheel tire, without the drive shaft receiver abutting the flange of the drive shaft adapter.

13. The dual wheel assembly of claim 12, wherein the outer surface of the drive shaft extension and the inner surface of the drive shaft receiver are uniform along the length where the drive shaft extension and drive shaft receiver telescopically overlap, and the drive shaft extension and the drive shaft receiver overlap along a distance of 4 inches or more.

14. The dual wheel assembly of claim 12, wherein the length of overlap of the drive shaft extension and drive shaft receiver can be varied by a distance of 2 inches or more by tightening the bolt.

15. The dual wheel assembly of claim 12, wherein the length of overlap of the drive shaft extension and drive shaft receiver can be varied by a distance of 4 inches or more by tightening the bolt.

16. The dual wheel assembly of claim 1, wherein the first end of the rod is threaded into the drive shaft extension and the second end of the end of the rod is a head secured against an exterior facing side of the outer wheel.

17. The dual wheel assembly of claim 16, wherein the length of overlap of the drive shaft extension and drive shaft receiver can be varied by a distance of 2 inches or more by tightening the bolt.

18. The dual wheel assembly of claim 16, wherein the length of overlap of the drive shaft extension and drive shaft receiver can be varied by a distance of 4 inches or more by tightening the bolt.

* * * * *